United States Patent [19]

Zinner

[11] Patent Number: 5,035,545
[45] Date of Patent: Jul. 30, 1991

[54] HOLDER FOR CUTTING TOOL INSERTS

[75] Inventor: Karl Zinner, Nuremberg, Fed. Rep. of Germany

[73] Assignee: Zinner GmbH Präzisionswerkzeuge, Nuremberg, Fed. Rep. of Germany

[21] Appl. No.: 485,091

[22] Filed: Feb. 26, 1990

[30] Foreign Application Priority Data

Mar. 3, 1989 [DE] Fed. Rep. of Germany ....... 3906822

[51] Int. Cl.$^5$ ............................................. B23P 15/28
[52] U.S. Cl. ................................. 407/110; 407/109; 407/108; 407/116
[58] Field of Search ............... 407/110, 109, 108, 116, 407/50

[56] References Cited

U.S. PATENT DOCUMENTS 4,357,123 11/1982 Zweekly ............................ 407/110
4,583,887 4/1986 Wertheimer ...................... 407/116

FOREIGN PATENT DOCUMENTS 0095062 10/1986 European Pat. Off. .
0259847 9/1987 European Pat. Off. .
3301919 7/1984 Fed. Rep. of Germany ...... 407/110
3420653 5/1985 Fed. Rep. of Germany .

Primary Examiner—Frederick R. Schmidt
Assistant Examiner—Lawrence Cruz
Attorney, Agent, or Firm—Jordan and Hamburg

[57] ABSTRACT

A holder for cutting tool inserts, particularly for carving or cutter bits, with a gripper slot, which in each case holds these inserts and the opposite jaws of which have an oval slotted area, into which a prop-open key with an elliptical cross sectional profile can be inserted and turned. The oval slotted region is formed from two recesses, which lie opposite to one another each in a jaw and which run corresponding to the two smaller apical circles of curvature of the elliptical cross sectional profile and are at a distance from one another, the magnitude of which lies between the length of the larger axis of the ellipse and that of the smaller axis of the ellipse.

18 Claims, 3 Drawing Sheets

HOLDER FOR CUTTING TOOL INSERTS

BACKGROUND OF THE INVENTION

The invention is directed to a holder for cutting tool inserts, particularly for carving or cutter bits, with a gripper slot, which in each case holds inserts and the opposite jaws of which have an oval slotted area, into which a prop-open key with an elliptical cross sectional profile can be inserted and turned.

It can be inferred from the German Offenlegungsschrift No. 34 20 653 that a gripper slot 2 of the tool support 1 is expanded at the end into a circular opening 3 (see FIG. 1 there), into which a locking plate 12 with two corresponding circular locking strips 13, 15 can be inserted according to FIGS. 4 and 5 there. This locking plate has a hexagonal borehole 17, by way of which it can be moved either into the unlocked position (see FIG. 4) or the locked position (FIG. 5) by means of a corresponding hexagonal key. In accordance with one development of the invention (see below), such an additional effort is avoided, because the specific cross sectional profile is combined structurally, according to this development, with the key itself.

Pursuant to the German Offenlegungschrift No. 31 33 029, a gripper slot 106 of a tool holder is constricted by means of a cam part 130. The cam part 130 has a circular cross sectional profile, which has a flattened segment 132. Here also, a hexagonal opening 131 is provided once again for a separate key, in order to move the opposite gripping surfaces 108, 110 of the gripper slot towards one another.

The German Offenlegungsschrift No. 30 44 790 shows in FIG. 4 an ejection lever 15 with an ejection shoulder 16, which is intended to be used in the recess 6 of the tool holder 1. The recess 6 once again has a circular profile, while the ejection shoulder 16 essentially is longitudinal. The ejection shoulder 16 has elongated, parallel sides, which are connected at their opposite ends in each case by rounded off bends. The purpose of the elongation is to press the ejection shoulder 16 with its rounded off narrow side or bend against the back of the cutter bit 8 when the handle 14 is turned, so that this cutter bit 8 is ejected out of its binding seat.

The teachings that can be inferred from the European Patent No. 259 847 agree essentially with those of the above German Offenlegungsschrift No. 31 32 029. As shown in the drawing, a wedge element 17 is inserted in the borehole 16. By means of the screw 18, the wedge element 17 can be adjusted so that the (upper) clamping jaw 7 is swivelled in the direction of the arrow 19 against the cutter bit S. As a result, the cutter bit S is gripped fast in its gripper slot 6. In column 3, line 42 of this reference, those skilled in the art are induced to construct the wedge element 17 as a cam or cone. The borehole 16, which accommodates the wedge element, is provided with a circular cross sectional profile.

Holding plates of the initially named type, which are slotted in fork-like fashion, are known from the European Patent No. 0 095 062. The propping open of one clamping jaw relative to the other opposite clamping jaw is brought about by the insertion and twisting of an elliptical key in the ovally shaped region of the gripper slot (oval slot region). However, a precise geometric shape of the oval slot region of this known holder is not specified. Consequently, an excessive propping open of the gripper slot, during which the yield point of the material is exceeded, cannot be avoided with certainty with this type of holder system. Rather, it may come to permanent deformations, particularly of opposite clamping jaws, with the consequence that a stable gripping of the tool inserts no longer is guaranteed. Moreover, the ease of inserting and/or turning the key web is made difficult in the known embodiment because of the course of the profile of the oval slot region, which is fitted only roughly to the elliptical shape of the propping open key.

SUMMARY OF THE INVENTION

From this follows the basic object of the invention to provide, while avoiding the disadvantages mentioned, a holder for tool inserts, which can be propped open with an elliptical key, has a high reliability and is easily handled when the inserts are changed and avoids wear, fatigue and permanent deformation of the material. To accomplish this objective in a holder with the initially named characteristics, it is proposed pursuant to the invention that the oval slotted region is formed from two opposite recesses, each of which is in a jaw and which run corresponding to the two smaller apical circles of curvature of the elliptical cross sectional profile and are at a distance from one another, the magnitude of which lies between the length of the larger axis of the ellipse and that of the smaller axis of the ellipse.

With these measures it is achieved that, on the one hand, the prop-open key can be introduced especially easily into the oval slotted region at a particular angular position. This is the case when the less curved parts of the elliptical cross sectional profile of the key lie opposite the aforementioned recesses, because the distance between the recesses is such, that it is larger than the smaller axis of the elliptical cross sectional shape. On the other hand, the key, when inserted, can be turned easily, because the recesses correspond in their course to the more highly curved parts of the elliptical cross sectional profile; therefore, when the propping open effect is brought about, the recesses and the more highly curved outer surfaces of the elliptical cross section can come into shape-flush engagement with one another, frictional effects that impede rotation being avoided. Finally, pursuant to the inventive concept, the extent or the width of the propping open of the opposite jaws can be dimensioned by the selective dimensioning of the larger elliptical axis of the cross section of the key, so that only an apportioned propping open is brought about, which does not lead to the unwanted effects mentioned above.

It is furthermore known from the European Patent No. 0 095 062 to provide one of the two jaws with a projecting stop to limit the insertion of the inserts and to taper the jaw with the stop in the insertion direction behind the oval slotted region in such a manner, that it can be propped open with respect to the opposite jaw. Starting out from this, it is within the scope of a further development of the invention that the oval slotted region is disposed in the insertion direction behind the stop. With this arrangement, the tool insert can be removed and exchanged in the propped-open state of the gripper slot. At the same time, the prop-open key can remain inserted in the oval slotted region. With the tapering, there exists, so to say, a moving joint, about which the jaw, which can be propped open, can be swung up by means of the key with the elliptical cross section. Because of the purposefully constructed moving joint, this can be accomplished by the operator with relatively little expenditure of force. Moreover, the material wear at the recesses and the elliptical cross section of the key, which rub against one another, is reduced and a low-cost, relatively softer material can find use.

A further development of the invention serves to simplify the manufacture of the prop-open key. Pursuant to this development, the differently curved apical regions of the elliptical cross sectional profile are separated from one another by edges, which preferably run in the insertion region of the key. With this, the more highly curved portions and the less highly curved portions of the elliptical cross sectional profile can be specified and shaped according to a given radius or circle of curvature. The technical advantage for the manufacturing process is obvious here.

The handling and, particularly, the guided insertion of the prop-open key into the oval slotted region, is furthermore facilitated if, pursuant to a development of the invention, the curvatures of greater radius of the elliptical cross sectional profile are each provided with an oblateness in their apical regions.

Moreover, it is within the scope of further inventive developments to construct the prop-open key in an L-like basic shape, the smaller arm of the L running out into said elliptical cross sectional profile. The handling is facilitated here insofar as the opertor need exert less force when turning the key and, associated therewith, when propping open the gripper slot because of the lever arm effect available with the larger arm of the L.

During rotational movements of the holder in working operation, the tool inserts inserted in the holder must be secured against being flung out by centrifugal forces. For this purpose, it is known (German Patent No. 34 16 712) to provide in the holding device a recess, into which the projection 21 of the tool insert protrudes. When the insert is pushed into the gripper slot of the holding device, the projection pushes back the jaw that forms the boundary of the gripper slot, until the projection catches in the recess. In order, in so doing, to avoid an excessive propping open of clamping jaws and the therewith associated material fatigue that results from exceeding the yield point etc., the combination of the known arrangement with the inventive elliptic cross sectional profile for the insertion of the prop-open key is particularly advantageous. For this purpose, a, if necessary, second projection stop on the holder is used. Said stop protrudes into the gripper slot in such a manner, that it prevents a movement of the cutter bit in the direction in which it would be pulled out of the gripper slot. The abutment face of this optional second stop for the tool insert can be constructed to run at right angles or obliquely to the direction of pulling; a concave or convex stop abutment surface can also be used for the invention.

Pursuant to a further development of this concept, the abutment face of the exterior surface belongs to a depression or recess in a jaw of the holder that can be propped open. With that, engaging or latching possibilities are created for appropriate projections of the tool insert. Pursuant to the invention, such projections, which are put into a jaw of the holder to prevent the insert being flung out, are distinguished by surfaces, which are prismatic in cross section, lie against the holder and thus make precise gripping possible. Within the scope of this concept, such prismatic surfaces can protrude either convexly ("positive prism") or also be inclined concavely towards the inside, forming, for example, a V groove ("negative prism").

Further characteristics, details and advantages of the invention arise from the following description of preferred examples of the operation of the invention, as well as from the drawings, which show the following.

DESCRIPTION OF THE PREFERRED EMBODIMENTS

Figure 1:
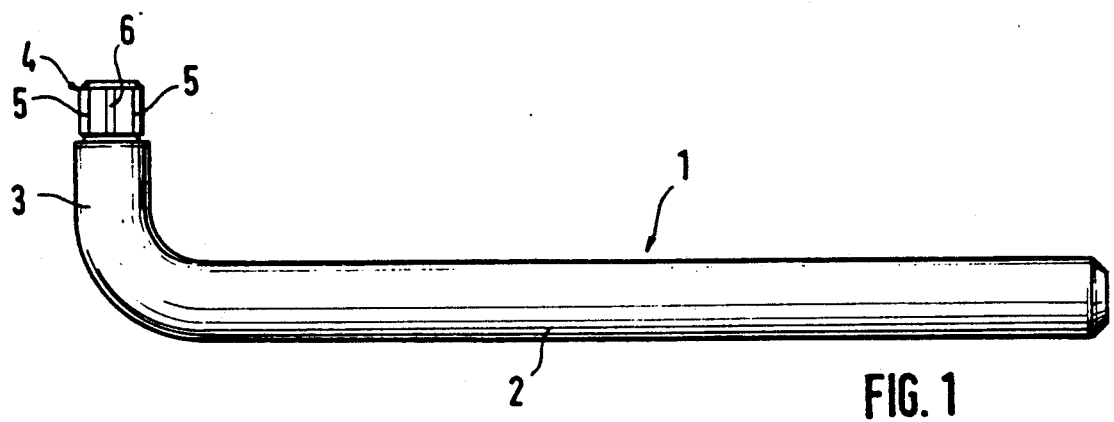
FIG. 1 shows a view of an inventive prop-open key.

Corresponding to the side elevation of FIG. 1, the prop-open key 1 has a basic L shape. The longer arm 2 of the L forms the handle part and the shorter arm 3 of the L the adjusting part. For adjusting, the free end of the shorter arm 3 of the L is provided with a spreader lug 4.

Figure 2:
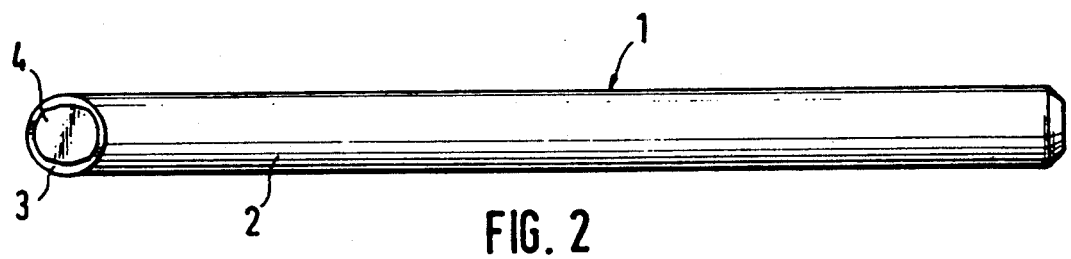
FIG. 2 shows a plan view of the key of FIG. 1.
Figure 3:
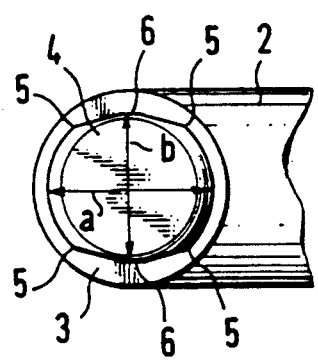
FIG. 3 shows a partial view of the key, corresponding to that of FIG. 2, but on an enlarged scale.
Figure 4:
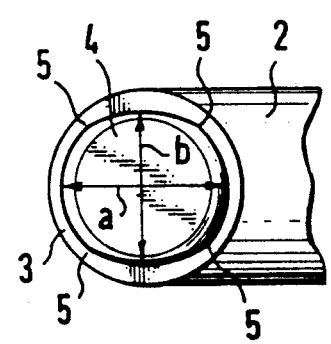
FIG. 4 shows a representation corresponding to that of FIG. 3 of a modified example of the operation.

According to FIGS. 2 to 4, which show the shorter arm 3 of the L in each case in front elevation, the cross sectional profile of the spreader lug 4 in each case is approximately elliptical with the longer axis of the ellipse a and the shorter axis of the ellipse b. The longer axis of the ellipse a is approximately parallel to the longer arm 2 of the L.

According to FIGS. 3 and 4, the regions with a different radius of curvature in the cross sectional profile of the spreader lug 4 are separated or divided from one another by edges 5, which run approximately perpendicular to the longer arm 2 of the L. According to FIG. 3, the apical regions of the parts of the cross sectional profile with the larger radius of curvature are in each case formed with an oblateness 6. The longer arms 2 of the L of the prop-open key 1 are shown partially in FIGS. 3 and 4.

Figure 5:
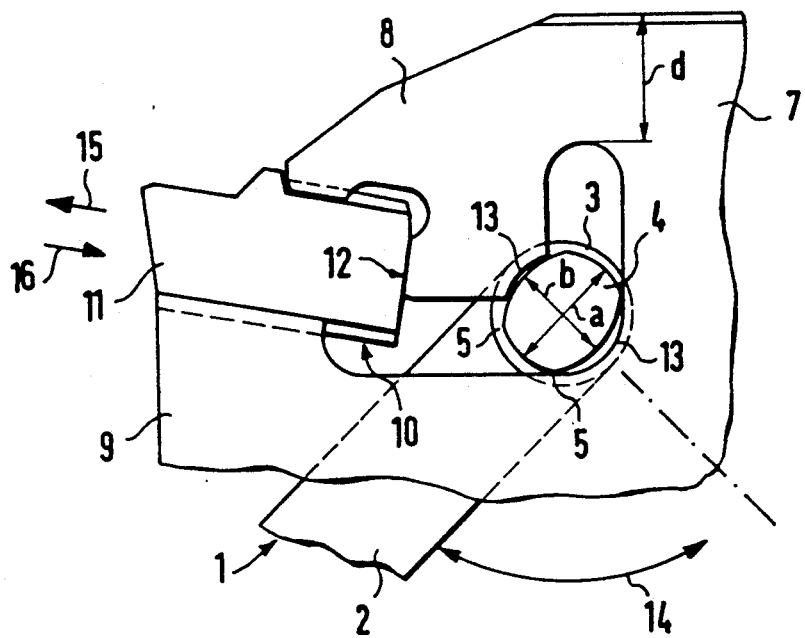
FIG. 5 shows a side elevation of a tool holder system with clamped insert and inserted prop-open key.

In FIG. 5, the whole of the inventive holding system is illustrated in side elevation. The holder plate 7 is bifurcated, forming an upper jaw 8 and a lower jaw 9, which lie opposite one another and border the gripper slot 10. A tool insert 11, which happens to be a cutter bit in the example shown, is inserted in this gripper slot 10. The back side of the cutter bit lies against a stop shoulder 12, which limits its insertion. The stop shoulder 12 is formed on the upper jaw 8 so as to project. Viewed in the insertion direction 16, the upper jaw 8 tapers greatly behind the stop shoulder 12 and consequently has a region of decreased thickness d. Approximately between the stop shoulder 12 and the region of decreased thickness d, the oval slotted region is disposed, which, pursuant to the invention, is formed and bounded by recesses 13 in the upper jaw 8 and in the lower jaw 9. The radius of curvature of the recesses 13 corresponds approximately to the radius of curvature of the more highly curved part of the cross sectional profile of the spreader lug 4, through which the longer axis a of the ellipse passes. In the angular position shown in FIG. 5 of the longer arm 2 of the L of the prop-open key 1, the less curved parts of the cross sectional profile are turned towards the recesses 13, the length of the smaller half axis b of the ellipse being less than the distance between the two recesses 13. Consequently, a space remains in each case between the spreader lug 4 and the recesses 13. If the longer arm of the L, that is, the handle part 2 is moved in accordance with the pivoting direction 14 from the position drawn into the position indicated by the broken line, the parts of the cross sectional profile, through which the longer axis a of the ellipse passes, move into the complementary concave recesses 13. Since the length of the longer axis a of the ellipse exceeds the distances between the recesses 13 (in the not propped open state), the upper jaw 8 is propped open away from the lower jaw 9 when there is a shift in the pivoting direction 14 into the position indicated by the broken line. This proping open is aided by the reduced thickness d of the upper jaw. The insert 11 can then be pulled out of the gripper slot 10 in the pulling direction 15. In the propped open position, the cross sectional profile engages the recesses 13 and, consequently, the prop-open key with its handle part 2 is in a stably held position.

Figure 6:
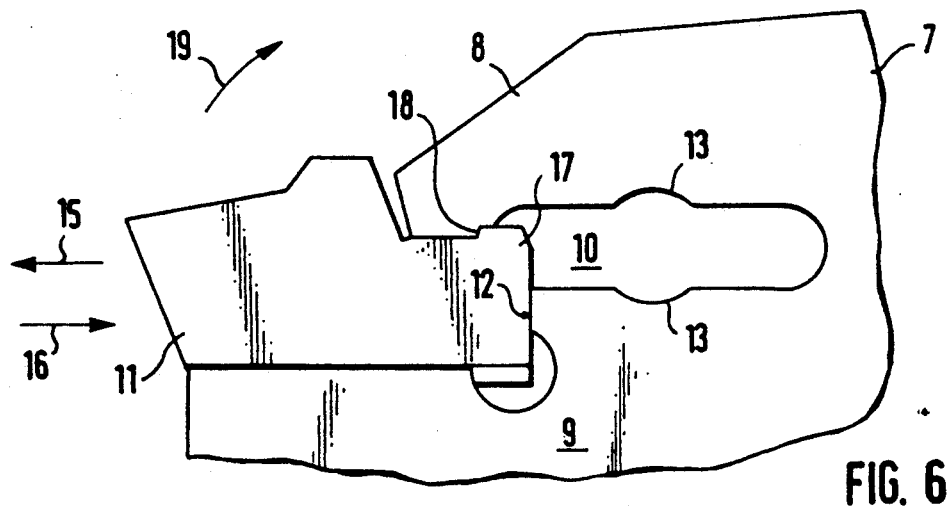
FIGS. 6 to 8 show further variations of inventive tool holder systems in an appropriate side elevation, in each case with a clamped insert and without the prop-open key.
Figure 7:
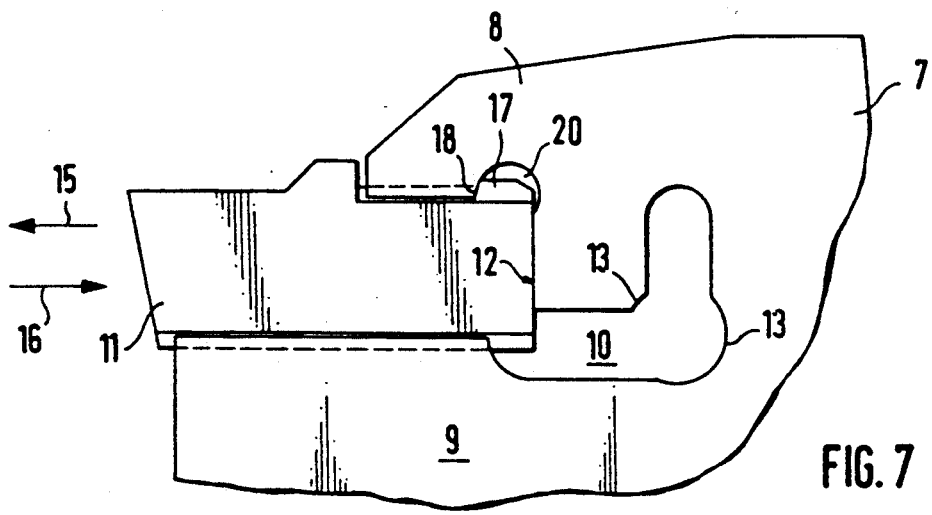
Figure 8:
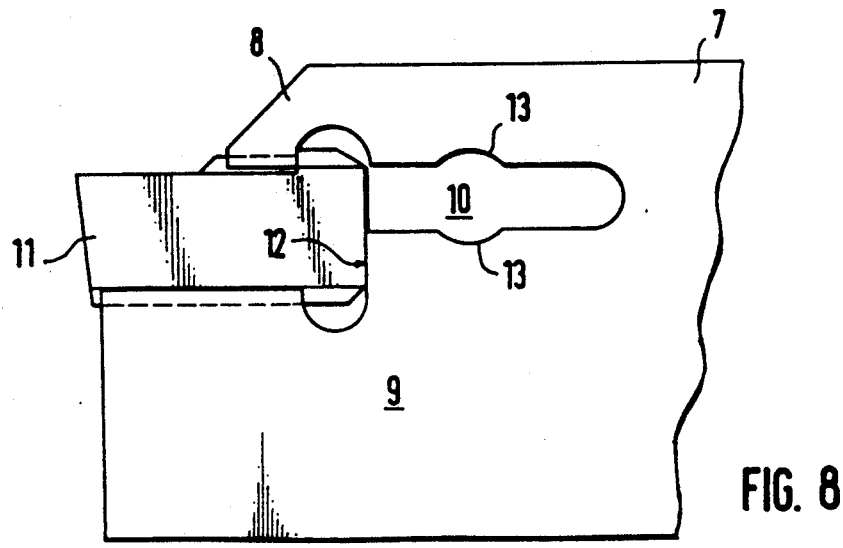

According to FIG. 6, the insert 11 is provided at its, when viewed in the pulling direction 15, rear end with an elevation or a projection 17, which-forming a common abutment face with the holder plate 7-interacts with a second stop shoulder 18 at the upper clamping jaw 8 of the holder plate 7. If the tool holder 7 is moved in the working operation in, for example, a direction of rotation 19, centrifugal forces, which act on the insert 11 in a direction 15 so as to pull it out of the gripper slot 10, are initiated. However, the centrifugal force-induced flinging out is prevented by the second stop shoulder 18, in that the insert 11, with its projection 17, lies immovable in the pulling direction 15 with its projection 17 against the second stop shoulder 18. According to FIG. 7, a further structural possibility consists therein that said second stop shoulder 18 is constructed as a part of the surface of a recess 20, which surrounds the projection 17 of the insert 11. The stop shoulder 12, which stands in the way of the insertion direction 16, is formed according to FIG. 7 at the upper clamping jaw 8 and, according to FIGS. 6 and 8, at the lower clamping jaw 9—in each case in the region between the recess 20 for the projection 17 and the 13 for the prop-open key. Indicated in each case by broken lines in FIGS. 7 and 8 are common abutment faces 21 of clamping jaws 8 and 9, as well as of insert 11. These abutment faces 21 are preferably formed with a prismatic cross section and, particularly in conjunction with the projection 17 and the second stop shoulder 18, as well as the first stop shoulder 12, result in a centered and precise clamping in the longitudinal insertion direction 15, 16, as well as in the transverse direction.

Figure 9:
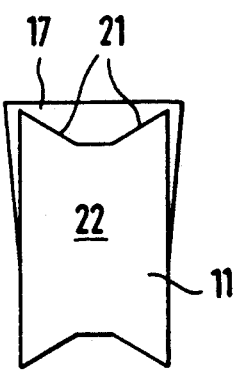
FIGS. 9 to 11 front and side elevations of different tool inserts for inventive tool holding systems.
Figure 10:
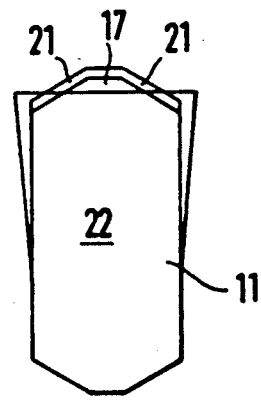
Figure 11:
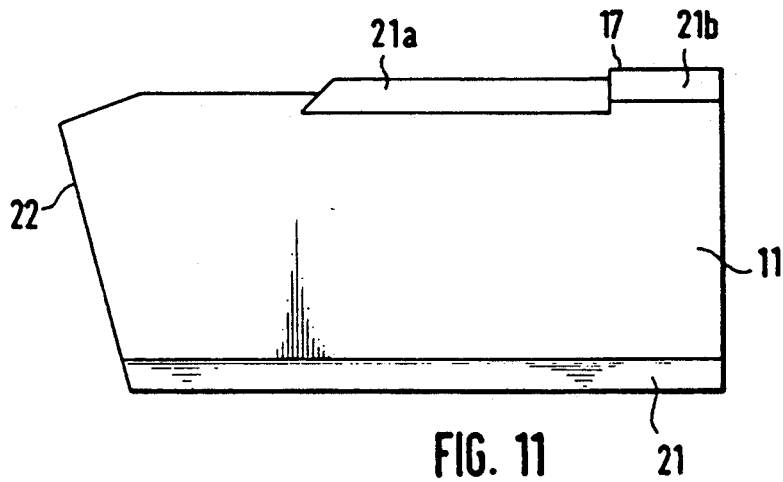
Figure 12:
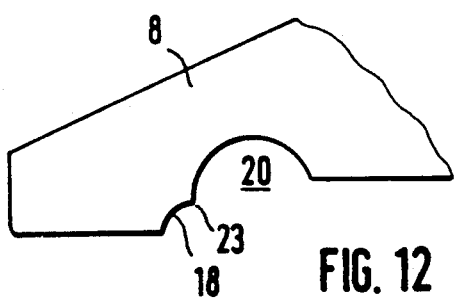
FIGS. 12 to 15 in each case show a partial side elevation of prop-open jaws of inventive tool holders.
Figure 13:
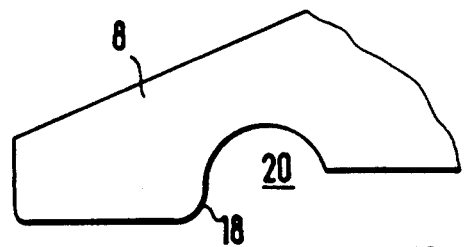
Figure 14:
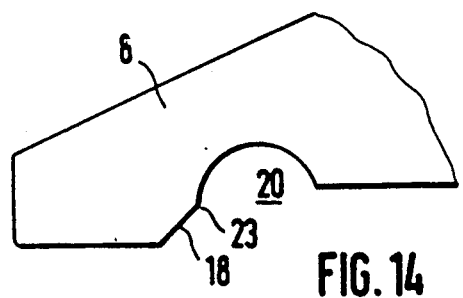

For the tool insert 11, shown in front elevation in FIG. 9 (diagrammatic representation), the prismatic abutment surfaces 21, which form a concave, V-shaped guiding groove for the insert 11, extend from the projection 17 in a longitudinal direction perpendicularly to the plane of the drawing. The projection 17 has essentially a trapezoidal cross section here and, in the upper region, rises above the abutment faces 21. A construction, complementary to the one just described, is shown in FIG. 10. Here the projection 17 is constructed with convexly protruding abutment faces 21, which run prismatically towards one another; on the other hand, the cutting wedge 22 of the insert 11 has the approximately trapezoidal cross section, which laterally projects beyond the projection 17. In the example of the operation of FIG. 11, the tool insert 11 is formed with two abutment surfaces 21a and 21b on its upper side. These abutment surfaces 21a and 21b are offset relative to one another and are separated by the formation of the projection 17. They may also, according to the constructions of FIGS. 9 and 10, have a prismatic structure. For prismatic abutment surfaces 21b of the projection 17, depressions or grooves, with a corresponding prismatic shape, can be formed in the upper clamping jaw 8 (see above) of the holder 7 (not shown).

Figure 15:
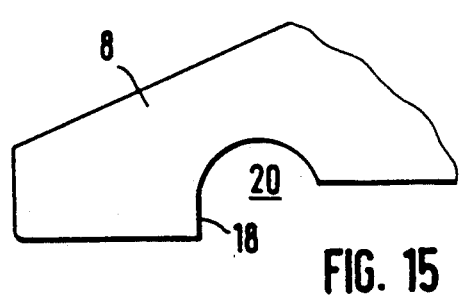

In FIGS. 12 to 15, variations of the second stop shoulder 18, which lie within the scope of the invention, are shown. For example, the stop shoulder 18 may be concavely round (FIG. 12), convexly round (FIG. 13), at an angle to the longitudinal direction 15, 16 of the insert gripper slot (FIG. 14) or perpendicular to this longitudinal direction 15, 16 (FIG. 15). At the same time, the second stop shoulder 18 goes over either steadily (FIGS. 13 and 15) or by way of edges 23 into the above-mentioned recess 20.

Above all, the examples of the operation of the invention of FIGS. 6 to 15 (with projection 17 and a second stop shoulder 18) are suitable, among other applications, for use in annular bits for working with metal, wood and stone. When impact drilling machines are used, recoil and kick back are compensated for by the adjacent areas of projection 17 and second stop shoulder 18, as well as the prismatic construction of these or other abutment faces between the insert 11 and the holder 7. This is also true for rotating tools, in which the cutting plates are subjected to centrifugal forces due to the rotation.

What I claim is:

1. A holder device for a cutting tool insert comprising a holder member having a slot which separates two spaced jaws, said jaws receiving and clamping said insert, said two spaced jaws having opposed arcuate surfaces arranged such that said jaws are opened by initially inserting an opening tool having an oval cross-sectional configuration between said opposed arcuate surfaces of said spaced jaws with the closely spaced opposed sides of the opening tool disposed opposite said opposed surfaces of said jaw and then rotating said opening tool so that the widely spaced opposed sides of said opening tool are disposed opposite said opposed arcuate surfaces of said jaw, said closely spaced opposed sides of said opening tool being spaced from one another a first diametrical distance, said widely spaced opposed sides of said opening tool being spaced from one another a second diametrical distance, said second diametrical distance being greater than said first diametrical distance, said opposed arcuate surfaces of said jaws being spaced from one another a third diametrical distance when in a natural unsprung state, said third diametrical distance being greater than said first diametrical distance and less than said second diametrical distance.

2. A holder device according to claim 1, wherein said opposed arcuate surfaces of said jaws are spaced from one another a third diametrical distance when said insert is clamped between said spaced jaws, said third diametrical distance being less than said second diametrical distance and greater than said first diametrical distance.

3. A holder device according to claim 1, wherein said tool has an L-shaped configuration, said oval tool having a generally elliptical cross-sectional configuration.

4. A holder device according to claim 1, wherein said holding member has a stop to limit the depth of insertion of said insert between said jaws, said insert being insertable in an insertion direction, said opposed arcuate surfaces of said jaws being disposed behind said stop in said insertion direction.

5. A holder device according to claim 1, wherein said opening tool has a tool axis midway between said closely spaced opposed sides and midway between said widely spaced opposed sides, said widely spaced opposed sides of said opening tool and said closely spaced opposed sides of said opening tool being joined by edges which are generally parallel to the axis of said tool.

6. A holder device according to claim 1, wherein one of said jaws has a jaw abutment means which engages said insert to prevent withdrawal of said insert from between said jaws.

7. A holder device according to claim 6, wherein said insert has an insert projection engaged by said jaw abutment means.

8. A holder device according to claim 6, wherein said jaw abutment means is a concave surface.

9. A holder device according to claim 6, wherein said jaw abutment means is a convex surface.

10. A holder device according to claim 6, wherein said jaw abutment means is oblique relative to the insertion direction of said insert.

11. A holder device according to claim 6, wherein said jaw abutment means is perpendicular to said insertion direction of said insert.

12. A holder device according to claim 6, wherein said jaw abutment means is part of a recess in one of said jaws.

13. A holder device according to claim 1, wherein said insert has a prismatic convex cross-sectional configuration which engages a corresponding configuration of said jaws.

14. A holder device according to claim 1, wherein said insert has a prismatic concave cross-sectional configuration which engages a corresponding configuration of said jaws.

15. A holder device according to claim 1, wherein said closely spaced opposed sides of said tool have a flatened curvilinear configuration.

16. A holder device according to claim 1, wherein said opposed arcuate surfaces of said jaws have a configuration corresponding generally to the configuration of said widely spaced opposed sides of said oval tool.

17. A holder device according to claim 1, wherein said opening tool is in an insertion rotational position when said opening tool is initially inserted between said opposed arcuate surfaces of said jaws, said closely spaced opposed sides of said opening tool being disposed opposite said opposed arcuate surfaces of said jaws when said opening tool is in said insertion rotational position, said opening tool being in an operable rotational position when said widely spaced opposed sides of said opening tool are disposed opposite said arcuate surfaces of said jaws, said operable rotational position being approximately 90 degrees from said insertion rotational position.

18. The combination comprising a holder means for a cutting tool insert and an opening tool for facilitating insertion and withdrawal of said insert from said holder means, said holder means having a slot which separates two spaced jaws, said jaws receiving and clamping said insert, said two spaced jaws having opposed arcuate surface such that said jaws are opened by initially inserting said opening tool having an oval cross-sectional configuration between said spaced jaws with the closely spaced opposed sides of the opening tool disposed opposite said opposed arcuate surfaces of said jaw and then rotating said opening tool so that the widely spaced opposed sides of said opening tool are disposed opposite said opposed arcuate surfaces of said jaws, said widely spaced opposed sides of said opening tool being spaced from one another a first diametrical distance, said closely spaced opposed sides of said opening tool being spaced from one another a second diametrical distance, said opposed arcuate surfaces of said jaws being spaced from one another a third diametrical distance when clamping said insert, said third diametrical distance being less than said second diametrical distance and greater than said first diametrical distance, said opening tool being in an insertion rotational position when said opening tool is initially inserted between said opposed arcuate surfaces of said jaws, said closely spaced opposed sides of said opening tool being disposed opposite said opposed arcuate surfaces of said jaws when said opening tool is in said insertion rotational position, said opening tool being in an operational rotational position when said widely spaced opposed sides of said opening tool are disposed opposite said opposed arcuate surfaces of said jaws, said operable rotational position being spaced approximately 90 degrees from said insertion rotational position.

* * * * *